United States Patent [19]

Momose

[11] Patent Number: 4,564,202
[45] Date of Patent: Jan. 14, 1986

[54] SEAL FOR PISTON ROD OF STIRLING ENGINE

[75] Inventor: Yutaka Momose, Anjyo, Japan

[73] Assignee: Aisin Seiki Kabushiki Kaisha, Kariya, Japan

[21] Appl. No.: 712,721

[22] Filed: Mar. 18, 1985

[30] Foreign Application Priority Data

Mar. 31, 1984 [JP] Japan .................... 59-46998[U]

[51] Int. Cl.$^4$ .................... F16J 15/40; F16J 15/56
[52] U.S. Cl. .................................. 277/3; 277/15; 277/12; 277/30; 277/177
[58] Field of Search .................. 277/3, 15, 16–21, 277/30, 12, 32, 33, 177; 60/517; 92/80, 82, 86, 165 R, 168

[56] References Cited

U.S. PATENT DOCUMENTS

| | | | |
|---|---|---|---|
| 2,964,339 | 12/1960 | Macks | 277/3 X |
| 3,810,634 | 5/1974 | Hakansson | 277/3 |
| 3,814,553 | 6/1974 | Hubschmann | 277/15 X |
| 4,083,566 | 4/1978 | Bengtsson et al. | 277/3 |
| 4,206,928 | 6/1980 | Asano | 277/15 |
| 4,247,121 | 1/1981 | Bergman | 277/3 |
| 4,432,556 | 2/1984 | Green et al. | 277/3 X |
| 4,483,141 | 11/1984 | Kobayashi et al. | 60/517 |

FOREIGN PATENT DOCUMENTS 104347  6/1983  Japan .

Primary Examiner—Robert S. Ward
Attorney, Agent, or Firm—Burns, Doane, Swecker and Mathis

[57] ABSTRACT

A seal for a piston rod of a Stirling engine forcibly returns a fluid which has leaked into an intermediate chamber from this chamber to a fluid-filled chamber via an oil scraper adjacent thereto. The seal includes an O-ring secured to the piston rod at a position where the O-ring will be situated immediately above an oil scraper when the piston rod is at bottom dead center. The intermediate chamber includes a space contiguous to the oil scraper and of a reduced diameter sized to the outer diameter of the O-ring. When the piston rod descends toward bottom dead center, the O-ring is carried thereby into the reduced-diameter space toward the oil scraper. Owing to sliding pressured contact between the outer circumference of the O-ring and the inner wall of the reduced-diameter space, the latter is pressurized to forcibly impel a fluid, which has leaked into the intermediate chamber, from the reduced-diameter space into the fluid-filled chamber through the oil scraper.

2 Claims, 2 Drawing Figures

SEAL FOR PISTON ROD OF STIRLING ENGINE

BACKGROUND OF THE INVENTION

1. Field of the Invention

This invention relates to a seal for the piston rod of a Stirling engine and, more particularly, to a piston rod seal adapted to forcibly return to a fluid-filled chamber a fluid which has leaked into an intermediate chamber.

2. Description of the Prior Art

In a Stirling engine, the interior of a cylinder is partitioned by a working piston into an expansion chamber consituting a high-temperature section, and a compression chamber defining a low-temperature section. A working gas is made to move back and forth between the expansion chamber and the compression chamber of a neighboring cylinder, thus to reciprocate the working piston. Motive power is taken off from the engine through a rod connected to the piston. The piston rod is in turn connected to a guide piston which operates in association with a power take-off, or PTO, mechanism. The guide piston is situated on a crank case or swash plate chamber side which is at atmospheric pressure, and the portion at which the piston rod and working piston are connected is situated on the compression side, which is at high pressure. As a result, a pressure differential develops across the piston rod-working piston junction, so that the working gas tends to leak from the high-pressure compression chamber into the lower pressure drive section, such as the crankcase. Since the output of the Stirling engine is proportional to the mean pressure of the working gas, leakage of the working gas from the compression chamber to, e.g., the crankcase must be dealt with in order to prevent a drop it engine output.

More specifically, in the conventional Stirling engine, a gas seal, an intermediate chamber held at the minimum pressure of the working gas, an oil scraper, a fluid filled chamber and an oil seal are disposed between the cylinder and crankcase in order to seal the piston rod. During reciprocation of the piston rod, however, the fluid which flows into the intermediate chamber while adhering to the piston rod is impossible to impede with the oil scraper. Although the fluid which thus flows into the intermediate chamber while adhering to the piston rod may not seem to pose a practical problem, there is the danger that the fluid may build up within the intermediate chamber with time. It is therefore desirable to have some means for removing the fluid in a more positive manner.

Another problem in Stirling engines is a drop in heat exchange efficiency and, hence, a decline in engine output, brought about when lubricating oil for the piston rod flows into the compression chamber, mixes with the working gas and adheres itself to the Stirling engine regenerator.

SUMMARY OF THE INVENTION

An object of the present invention is to provide a Stirling engine piston rod seal which solves the aforementioned problems encountered in the prior art.

Another object of the present invention is to provide a Stirling engine piston rod seal adapted to forcibly return to a fluid-filled chamber a fluid which has penetrated an intermediate chamber through an oil scraper.

According to the present invention, the foregoing objects are attained by providing a piston rod seal which includes an O-ring fixedly secured to the piston rod at a position where the O-ring will be situated immediately above an oil scraper when the piston rod is at bottom dead center. Further, the intermediate chamber is formed to include a first space and a second space of a diameter smaller than that of the first space and sized to the outer diameter of the O-ring, the second space being contiguous to the oil scraper, which is adjacent a fluid-filled chamber. When the piston rod descends toward bottom dead center, the O-ring is carried thereby into the second space toward the oil scraper. Owing to sliding pressured contact between the outer circumference of the O-ring and the inner wall of the second space, the second space is pressurized to forcibly return a fluid, which has leaked into the second space of the intermediate chamber via the oil scraper or which has attached itself in the form of a film to the piston rod, from the second space to the fluid-filled chamber through the oil scraper. Though the O-ring leaves and, hence, depressurizes the second space of the intermediate chamber when the piston rod makes its upward stroke, the drop in pressure draws the lip of the oil scraper into tight pressured contact with the surface of the piston rod to prevent leakage of fluid into the intermediate chamber.

Thus, according to the present invention, the intermediate chamber is provided with the second space of reduced diameter, the O-ring is fixedly secured to the piston rod as described, and the O-ring performs a pumping action within the intermediate chamber as the piston rod reciprocates, with the pumping action serving to expel the fluid from, and prevent the entry of fluid into, the intermediate chamber in cooperation with the oil scraper. Thus, through a simple and inexpensive construction, the seal of the present invention performs an active, rather than a passive, sealing operation that assures reliable sealing at all times.

Other features and advantages of the present invention will be apparent from the following description taken in conjunction with the accompanying drawings, in which like reference characters designate the same or similar parts throughout the figures thereof.

FURTHER DESCRIPTION OF THE PRIOR ART

Figure 1:
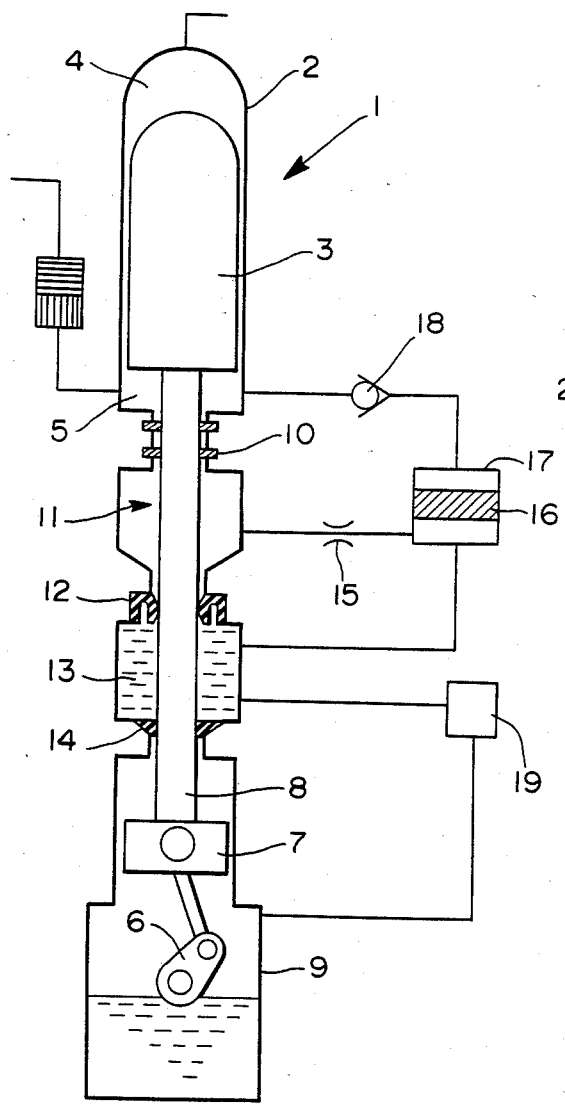
FIG. 1 is schematic view showing a prior-art seal for the piston rod of a Stirling engine.

As shown in FIG. 1, and as disclosed in the specification of Japanese Patent Application Laid-Open No. 58-104347, a Stirling engine 1 includes a cylinder 2 the interior of which is partitioned into a high-temperature expansion chamber 4 and a low-temperature compression chamber 5 by a working cylinder 3. The expansion chamber 4 communicates with the compression chamber of a neighboring cylinder (neither of which are shown) through a heater, regenerator and cooler, not shown. A working gas such as helium or hydrogen is made to move back and forth between the expansion chamber 4 and the compression chamber of the neighboring cylinder during which time cycles of isothermal compression, isovolumetric change, isothermal expansion and isovolumetric change are repeated to reciprocate the working piston up and down.

A piston rod 8 has one end connected to the working piston 3 and the other end thereof connected to a guide piston 8. The guide piston 8 is operatively associated with a power take-off mechanism 6 such as a crank mechanism. The reciprocating motion of the working piston 3 may thus be taken off the engine via the piston rod 8 to perform mechanical work outside the engine assembly.

Means for sealing the piston rod 8 are provided between the cylinder 2 and a crankcase 9. These means, arranged in the order mentioned starting from the side of the compression chamber 5, include a gas seal 10, an intermediate chamber 11 which is maintained at the minimum pressure of the working gas, an oil scraper 12, a fluid-filled chamber 13 filled at all times with lubricating oil, water or the like, and an oil seal 14. The intermediate chamber communicates with the compression chamber 5 via a stationary orifice 15, a filter case 17 having an oil filter 16, and a check valve 18. The check valve 18 serves to hold the intermediate chamber 11 at the minimum pressure of the working gas. The filter 16 is operative to filter the oil in the working gas that flows from the intermediate chamber 11 to the compression chamber 5. The stationary orifice 15 located between the filter case 17 and the intermediate chamber 11 performs a buffering action when there is a fluctuation in working space pressure as at such time that the engine output is controlled, and prevents a reverse flow of the fluid, such as oil or water, within the fluid-filled chamber 13. A fluid return valve 19 is connected between the crank case 9 and fluid-filled chamber 13 for the purpose of returning excess fluid from the chamber 13 to the crank case 9. A pump, not shown, is provided between the crank case 9 and fluid-filled chamber 13. It is also possible to provide a fluid circuit, not shown, for supplying fluid to the fluid-filled chamber 13.

Though the foregoing prior-art arrangement proposed previously by the Applicant exhibits a satisfactory piston rod sealing performance in practical use, a problem has been encountered and verified in tests. The problem is that during reciprocation of the piston rod 8, it is impossible for the oil scraper 12 to block the fluid which enters the intermediate chamber 11 while attached to the piston rod. The fluid which enters the intermediate chamber 11 while adhering to the piston rod 8 seems not to be a problem in practical terms with a Stirling engine of the above-described construction. Nevertheless, there is some danger that the fluid entering the intermediate chamber 11 will accumulate there with the passage of time.

The present invention contemplates elimination of this and other problems encountered in the piston rod seal a prior-art example of which has been described with reference to FIG. 1.

DESCRIPTION OF THE PREFERRED EMBODIMENT

Described hereinafter will be an embodiment of a Stirling engine piston rod seal according to the present invention.

Figure 2:
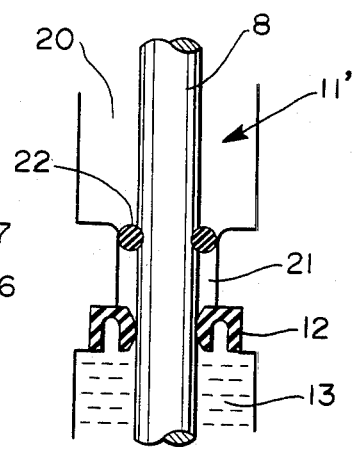
FIG. 2 is schematic view, shown in part, illustrating a Stirling engine piston rod seal embodying the present invention.

With reference to FIG. 2, a piston rod seal according to the present invention includes an O-ring 22 which cooperates with the piston rod 8 and the inner wall of an intermediate chamber 11'. Like the intermediate chamber 11 of FIG. 1, the intermediate chamber 11' is disposed in a similar arrangement between the cylinder 2 and crankcase 9, is maintained at the minimum pressure of the working gas and is connected to the compression chamber 5 in the manner described above. The intermediate chamber 11' is formed to include a portion 20 of a first diameter, and a portion 21 of a second, smaller diameter sized to the outer diameter of the O-ring 22 and contiguous to the oil scraper 12. The oil scraper 12 is in turn disposed adjacent the fluid-filled chamber 13. The O-ring 22 is fixedly secured to the piston rod 8 which, as described above, undergoes reciprocating motion. The O-ring will therefore move up and down within the intermediate chamber 11' as the piston rod 8 reciprocates. The O-ring 22 is affixed to the piston rod 8 at a position where it will be situated immediately above the oil scraper 12 and, hence, within the reduced-diameter portion 21 of the intermediate chamber 11', when the piston rod 8 is at bottom dead center.

When the piston rod 8 decends toward the bottom dead center point of its stroke, the O-ring 22 is carried thereby into the similarly sized reduced-diameter portion 21 of the intermediate chamber 11' so that the outer circumferential portion of the O-ring comes into pressured sliding contact with the inner peripheral wall of the reduced-diameter portion. As the piston rod 8 descends and carries the O-ring 22 toward the oil scraper 12, the volume delimited within the reduced-diameter portion 21 of the intermediate chamber 11' by the O-ring 22 and oil scraper 12 is gradually reduced, thereby elevating the pressure prevailing within the reduced-diameter portion 21. The higher pressure forces any fluid, which has flowed into the reduced-diameter portion of the intermediate chamber 11', into the underlying fluid-filled chamber 13 through the oil scraper 12.

When the piston rod 8 makes its upward stroke, the O-ring 22 affixed thereto is withdrawn from the interior of the reduced-diameter portion 21, while still in pressured sliding contact therewith, and away from the oil scraper 12. This increases the volume of, and hence depressurizes, the reduced-diameter portion 21 of the intermediate chamber 11'. The drop in pressure draws the lip of the oil scraper 12 into tighter contact with the piston rod 8, thereby making it extremely difficult for any fluid to leak into the intermediate chamber from the fluid-filled chamber 13.

As many apparently widely different embodiments of the present invention can be made without departing from the spirit and scope thereof, it is to be understood that the invention is not limited to the specific embodiments thereof except as defined in the appended claims.

What we claim is:

1. In a seal for a piston rod of a Stirling engine having a reciprocating piston rod, an intermediate chamber surrounding the piston rod and held at a minimum pressure of a working gas, a fluid-filled chamber surrounding the piston rod for lubricating the piston rod, and an oil scraper disposed between the intermediate chamber and the fluid-filled chamber for blocking flow of a fluid from the fluid-filled chamber to the intermediate chamber, an improvement comprising an annular sealing member fixedly secured to the piston rod at a position where said annular sealing member will be situated immediately above the oil scraper when the piston rod is at a bottom dead center point of its reciprocating motion, the intermediate chamber being formed to include a first space of a first diameter and a second space of a second diameter smaller than said first diameter, said second space having its diameter sized to an outer diameter of said annular sealing member and being contiguous to the oil scraper, whereby when the piston rod descends toward the bottom dead center point, said annular sealing member is carried thereby into said second space toward the oil scraper to pressurize said second space in order to forcibly return a fluid from said second space to the fluid-filled chamber through the oil scraper.

2. The seal according to claim 1, wherein said annular sealing member is an O-ring.

* * * * *